(12) United States Patent
Chen et al.

(10) Patent No.: US 8,014,752 B2
(45) Date of Patent: *Sep. 6, 2011

(54) AUTOMATIC WIRELESS UTILIZATION OF CELLULAR TELEPHONE DEVICES

(75) Inventors: Yen-Fu Chen, Austin, TX (US); John Hans Handy-Bosma, Austin, TX (US); Fabian F Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,532

(22) Filed: Sep. 13, 2010

(65) Prior Publication Data

US 2011/0003578 A1 Jan. 6, 2011

Related U.S. Application Data

(63) Continuation of application No. 11/338,991, filed on Jan. 25, 2006, now Pat. No. 7,844,247.

(51) Int. Cl.
*H04M 11/04* (2006.01)

(52) U.S. Cl. ............ 455/404.1; 455/41.2; 455/575.9; 455/99; 455/412.2

(58) Field of Classification Search .......... 455/418, 455/419, 420, 404.1, 41.2, 575.9, 99
See application file for complete search history.

(56) References Cited

U.S. PATENT DOCUMENTS 6,166,656 A 12/2000 Okada
(Continued)

OTHER PUBLICATIONS

USPTO: examination correspondence from parent U.S. Appl. No. 11/338,991, filed on Jan. 25, 2006, by Yen-Fu Chen, now issued as US Patent 7,844,247.

Ertico, et al., "E-Merge", Downloaded on Dec. 2, 2005 from http://www.gstforum.org/en/subprojects/rescue/about_gst_rescue/introduction/e-merge.htm.

(Continued)

*Primary Examiner* — Kamran Afshar
*Assistant Examiner* — Vladimir Magloire
(74) *Attorney, Agent, or Firm* — Robert H. Frantz; David A. Mims, Jr.; Mark C. Vallone (57) ABSTRACT

Automatic utilization of cellular telephone device is achieved by a controller and a short-range wireless communicator mounted on a vehicle, the short-range wireless communicator having a peer-to-peer communications capability; responsive to an emergency notification message, pinging by the short-range wireless communicator a long-range communication device contemporaneously within range of the peer-to-peer communications capability, the long-range communication device being physically detached from the vehicle; subsequent to the pinging, receiving a response message indicating that user authorization is required; responsive to the response message, sending by the short-range wireless communicator to the long-range communication device a request for authorization message; subsequent to a user responding in an affirmative manner to the authorization request, receiving an authorization message to co-opt the long-range communication device; and responsive to the authorization, sending an emergency notification message from the short-range wireless communicator through the co-opted long-range communication device to a specified recipient party.

18 Claims, 7 Drawing Sheets

U.S. PATENT DOCUMENTS

| | | |
|---|---|---|
| 6,642,844 B2 | 11/2003 | Montague |
| 7,379,730 B2 | 5/2008 | Flick et al. |
| 7,844,247 B2 | 11/2010 | Chen et al. |
| 2003/0216134 A1 | 11/2003 | Mutoh |
| 2004/0142678 A1 | 7/2004 | Krasner |
| 2004/0203563 A1 | 10/2004 | Menard |
| 2005/0037730 A1 | 2/2005 | Montague |
| 2005/0097386 A1 | 5/2005 | Datta et al. |

OTHER PUBLICATIONS

Fire Chief, "Smart Cars Improve Crash Victims Chances", Downloaded on Dec. 2, 2005 from: http//firechief.com/ar/fiefighting_smart_cards_improve/.

UCABLES.COM, "Cellphone Accessories-Bluetooth Accessories-Mobile phone accessories", downloaded on Dec. 2, 2005 from http://www.ucables.com.

AUTOMATIC WIRELESS UTILIZATION OF CELLULAR TELEPHONE DEVICES

CROSS-REFERENCE TO RELATED APPLICATIONS

Claiming Benefit Under 35 U.S.C. 120

This patent application is a continuation of U.S. patent application Ser. No. 11/338,991, filed on Jan. 25, 2006, by Yen-Fu Chen, now issued as U.S. Pat. No. 7,844,247.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This invention relates to technologies for utilization of communication capabilities on an on-demand basis by co-opting telecommunications devices which are within a short-range wireless range of a system requiring longer-range communications.

2. Background of the Invention

Air bags in vehicles are deployed by impact sensors located in the vehicle's crush zones. In accidents where emergency medical response ("EMS") is required, the driver and passengers may be unconscious and unable to solicit help. One or more of those involved in an accident may have a cell phone, but unconsciousness or mobile impairment may prevent its use to contact EMS, loved ones, insurance agency, etc.

When car sensors detect sufficient impact to trigger air bags, the accident should be assumed to be critical—every second may count, with lives at stake. There are several attempts on the market to address this problem, all of which have shortcomings.

For example, the European "E-Merge" research project investigated notifying emergency services when a vehicle is involved in a crash, and sending accident data picked up from sensors. It uses a device that is attached to the underside of the dashboard, and is activated by the sensor that triggers an air bag in a crash. This system uses an on-board cellular phone device having an extended range, similar to that of General Motor's OnStar™ system. These type of technologies are only helpful, of course, for those vehicles which are equipped with the on-board cellular equipment. Additionally, even equipped vehicles may fail to make an emergency notification call if the crash causes damage to the on-board cellular equipment itself.

For vehicle's equipped with handsfree on-board cellular telephones, these may be of limited use following a crash if one or more user's are able to speak, and if the equipment is still functional.

Consequently, there is a need in the art for a system and method which provides a more reliable means of communication and notification of emergency services following a vehicle crash. This system should be more robust, and less prone to damage during the crash, and should not require a conscious user to activate it or to send information to EMS.

SUMMARY OF THE INVENTION

Embodiments according to the present invention provides a vehicle-mounted system and method to automatically detect a vehicle crash or failure using sensors present available on the vehicle. The vehicle-borne system utilizes a short-range communications means, such as Bluetooth or Infra-red Data Arrangement ("IrDA"), to determine if any suitable communications devices having long-range communications capabilities are within range of the short-range communications signal. If so, a device is selected and co-opted, causing the device to establish communications with EMS via the long-range signal, and to transmit important information collected by the vehicle-mounted system, without intervention of a vehicle occupant.

Figure 1:
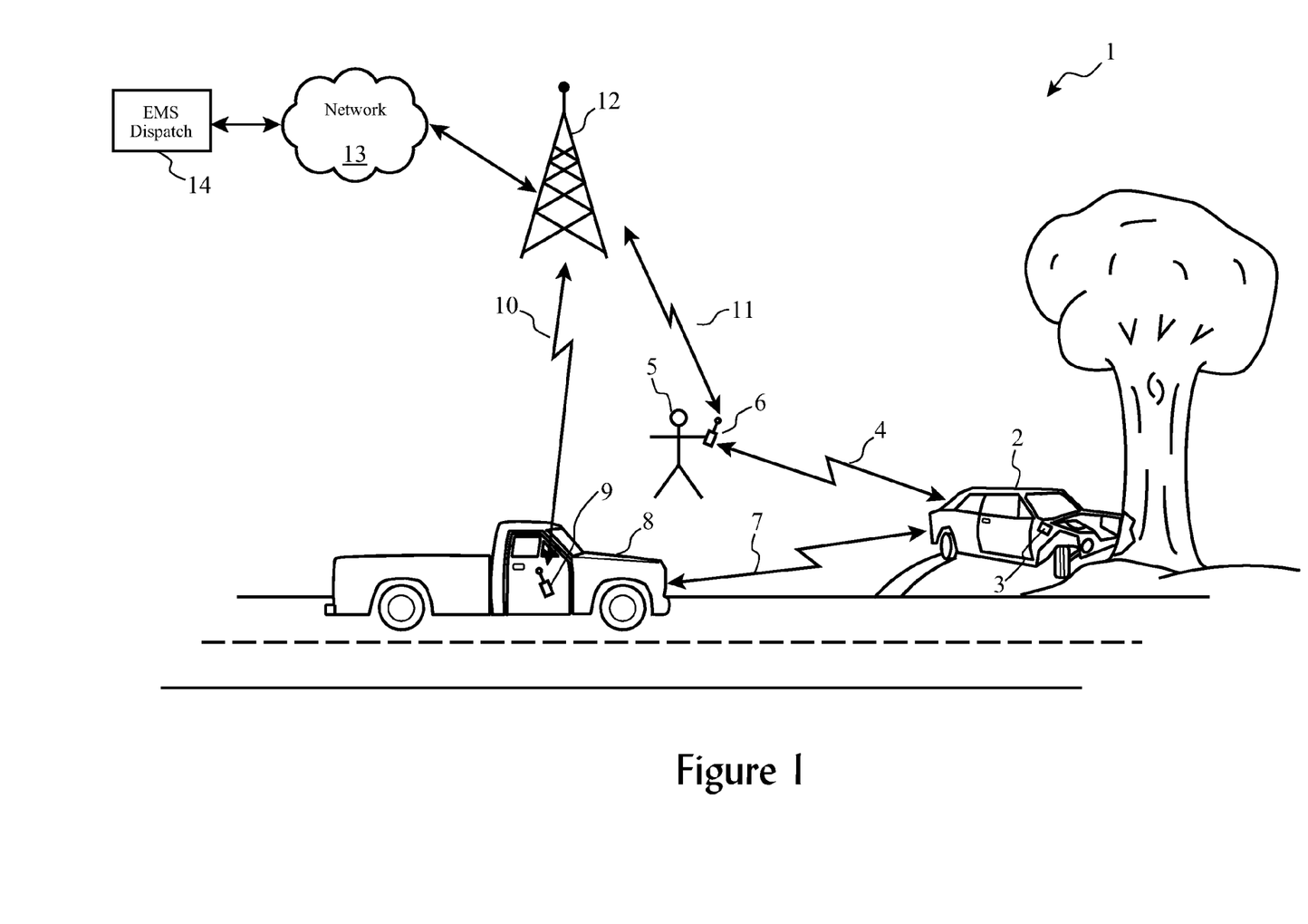
FIG. 1 illustrates a system view of the present invention.

For example, as shown (1) in FIG. 1, following a crash of a first vehicle (2), the vehicle-mounted system (3) may detect the crash using various known sensors, and then searches and detects a Bluetooth-enabled wireless telephone within range of the vehicle, which may in actuality be a telephone worn by a vehicle occupant, or may even be a telephone in the possession of a passer-by (9) in a nearby vehicle (8), or may be a telephone (6) in the possession of an on-looker (5).

An embodiment of the invention then co-opts the telephone which is detected within short-range communications, and uses that local link (4, 7) to make a long-range communications (10, 11) to a regional cellular tower, Wi-Fi access point, etc. (12). From there, the connection is completed through a appropriate network (13), such as a cellular network and/or the public switched telephone network ("PSTN"), a broader data network such as a virtual private network ("VPN") or the Internet, etc. (13). Finally, the communications, preferably including location and crash information, is received by the appropriate EMS dispatch or data center (14).

In this way, the occupants of the vehicle, who may be injured or unconscious, are not required in the process to make the emergency notification. Additionally, vehicle-mounted communications equipment need only complete a short-range connection, such as a Bluetooth or Wi-Fi connection, thereby increasing the chance of finding and using a long-range communicator in the vicinity which is less likely to be damaged or compromised.

According to another aspect of embodiments of the present invention, the embodiments are configured by a user or service provider with a set of rules and communications targets based upon sensor information in the vehicle, time of day, location of the vehicle, etc. This customization aspect allows a user to automatically notify chosen parties under specified conditions. For example, if a fuel gauge is reading dangerously low, and time of day is late at night, a list of local relatives may be searched, and the closest relative can automatically be notified.

BRIEF DESCRIPTION OF THE DRAWINGS

The following detailed description when taken in conjunction with the figures presented herein provide a complete disclosure of the invention.

DESCRIPTION OF THE INVENTION

The present invention integrates functionality of vehicle sensors and cell phones to provide a device that enables direct communication between vehicle sensor(s) and a non-vehicle-mounted cell phone via a short-range network protocol, including functionality on the co-opted cell phone that allows a user to manage the automatic dialing to notify interested parties in real-time.

In any of a number of available embodiments, the present invention provides one or more of the following features or advantages over the currently available technology:
(a) subsequent to an accident, one or more cell phone in or near the vehicle are co-opted to automatically dial and notify interested parties; and
(b) a user can configure which parties are contacted under which conditions directly from an in-range cell phone, or via service provider
(c) interested parties can be divided into personal or others, and number of auto dial numbers are configurable, such as:
  (i) Personal: Parents, close friends, etc.;
  (ii) Emergency: 9-1-1, 3-1-1, hospital's EMS service; and
  (iii) Others: Insurance, towing services;
(d) data from sensor device(s), the vehicle itself, or passenger information is passed along in the cell phone notification message as data, text or voice messages;
(e) persons on the emergency notification list receive a special signal as a quick indicator of urgency from someone in a severe accident or critical situation, which can include a special light, special pattern of blinking, text message, alert tone, etc.;
(f) based on the sensor information, the condition and location of the vehicle can also be sent to interested parties;
(g) if the driver is conscious, pushing an emergency code will disable the notification, or will send a dismissal message to interested parties (9-1-1, wrecker service, etc.);
(h) long-range communications can be accomplished by co-opting a cell phone, or alternatively co-opting other devices such as a personal digital assistant ("PDA"), portable computer, using pager services, email services, or instant messenger services; and
(i) the system may be employed to reduce fraud and investigation expenses by insurance companies by helping confirm each accident, recording severity of impact, and directly notifying insurance agents and/or adjusters.

Preferably, the functionality of the co-opted cell phone is provided as a downloadable feature to the cell phone, such as a Palm Computing PalmOS™-compatible program, Microsoft Windows CE™-compatible program, or proprietary program.

Figure 3:
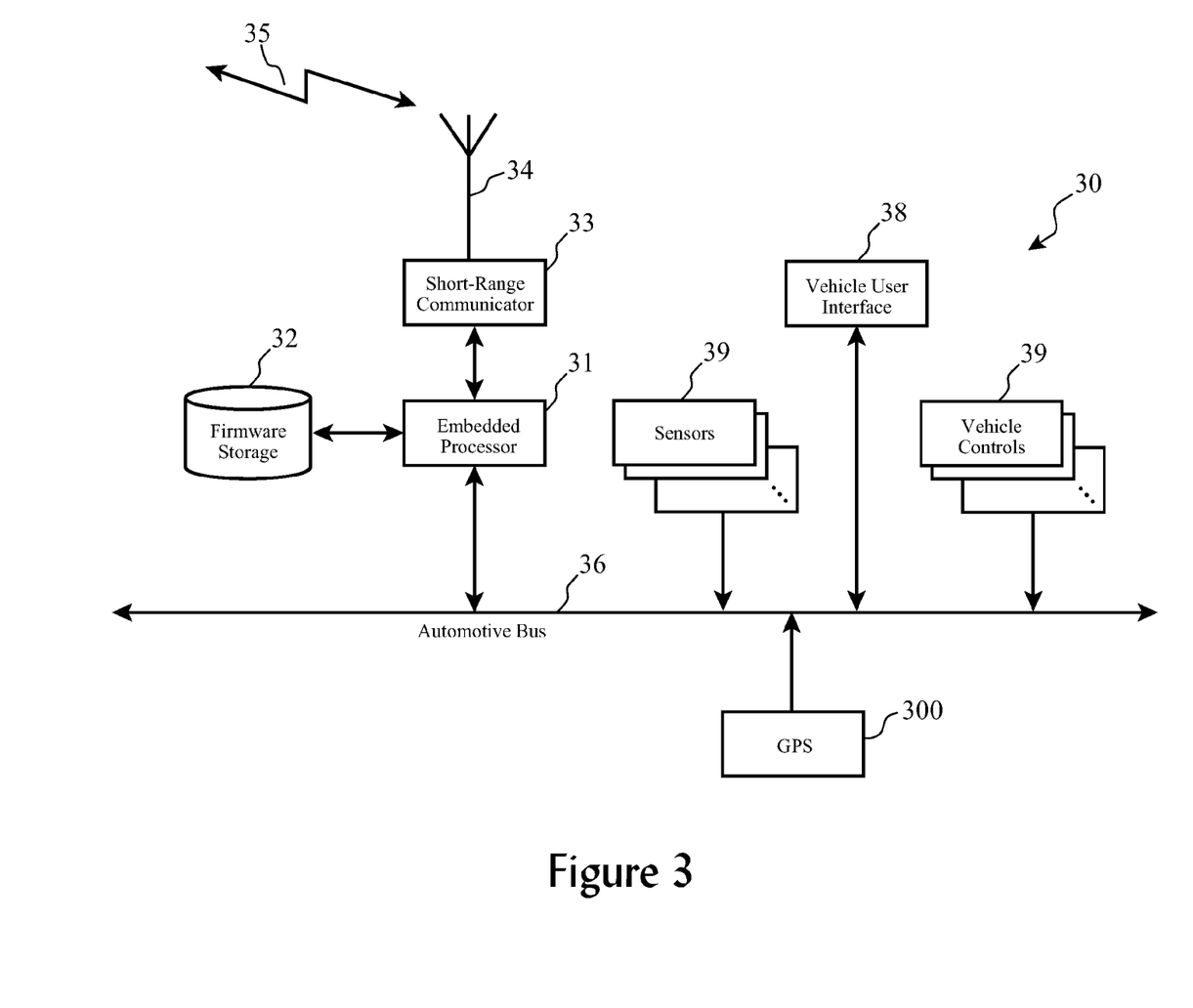
FIG. 3 provides a functional view of the enhanced electronic control module for a vehicle integrated with the rest of the vehicle's subsystems.

With respect to the vehicle-mounted equipment, the invention is preferably realized in whole or part as software-based logical processes, circuitry, or both, in conjunction with and cooperation with an microprocessor-based vehicle-mounted electronic control module ("ECM"), such as the system (30) shown in FIG. 3.

In this system, an embedded microprocessor (31), such as a RISC processor, is provided with storage media (32), such as random access memory or non-volatile memory, in which computer-executable instructions or "software" are stored that implement the logical processes of the invention. Alternatively, the ECM may be equipped with the logical operations of the invention embodied as circuitry, such as an Application Specific Integrated Circuit ("ASIC"), or a programmable logic device.

The embedded processor (31) is also interfaced to a short-range (35) communicator (33) with transmission antenna or optical transceiver (34), such as a Bluetooth communicator, or IrDA communicator. Such communicator devices are well known in the art, and are readily available from integrated circuit manufacturers suitable for inclusion in such embedded control designs.

The ECM is also interfaced preferably to a bus suitable for communications with the vehicle's user interface (38) (e.g. dashboard indicators, buttons, knobs, annunciators, etc.), the vehicle's sensors (37) (e.g. engine trouble sensors, fuel gauge, impact sensors, tire pressure sensors, lamp burn-out indicators, etc.), vehicle controls (39) (e.g. user-operable levers and buttons, transmission selector, etc.), and optionally a location determination system (300) (e.g. a Global Positioning System, etc.), such as a Controller Area Network bus ("CANbus"), which is commonly employed in many vehicles. Alternatively, other suitable buses, including but not limited to Universal Serial Bus ("USB"), Ethernet, or proprietary buses may be employed for this purpose. Some user interface, controls, and sensors may be directly wired or linked to the ECM, as well.

Figure 4:
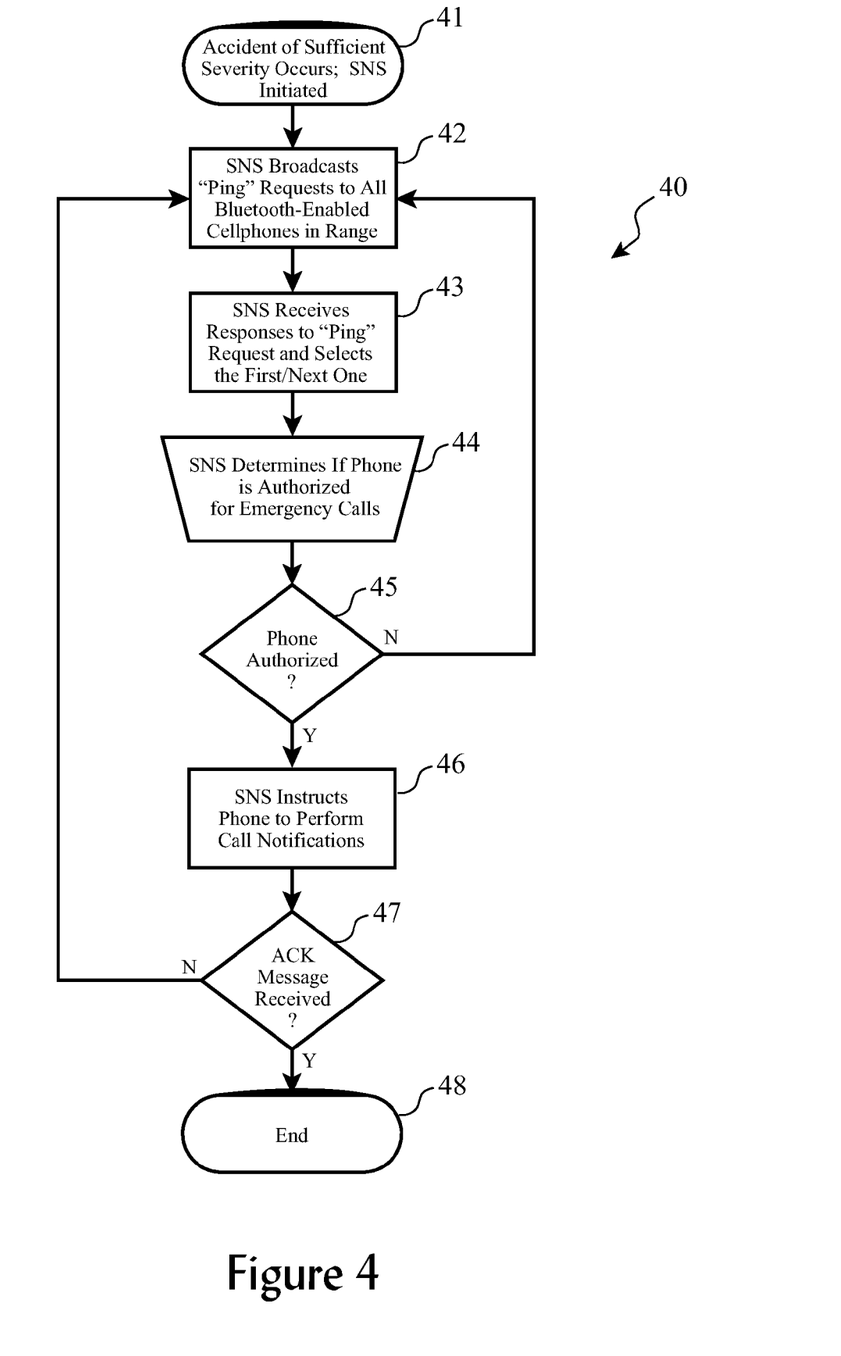
FIG. 4 details a top-level logical process according to the invention.

We now turn our discussion to the logical or logical processes of the invention by disclosing an overall logical process for achieving automatic notification. First, upon determination (41) of an accident or other condition of sufficient severity by specialized sensors in the car, the situation notification system ("SNS") is initiated. This system broadcasts (42) a message to all short-range communications devices in the area, such as all Bluetooth-enabled cell phones within the range of the short-range communications link.

The message is preferably a "ping" type of request, and its purpose is to find what longer-range communicators are in the area, if any, and which device owners would enable or have enabled the phones to be used in such a situation notification procedure. The "ping" request preferably contains pertinent situation or accident data, such as the severity of the crash, the call notification numbers, the location, type, model, of the vehicle, etc.

In a realization of the invention utilizing Bluetooth-enabled cell phones, there are at least two ways a cell phone owner can indicate that the phone can be used for emergency calls:
(1) As a configurable preference in the software application that sets up the call notification list; or
(2) As a response to a authorization request for such purposes by the SNS.

We prefer to use a broadcast "ping" request so that any Bluetooth-enabled cell phones that are in proximity can be used, not limited only to the driver's cell phone, such that other cell phones in the are may be used (e.g. from a backseat occupant, a passer-by, an on-looker, etc.).

The SNS then interacts with the first Bluetooth-enabled cellphone that responds (43) to the ping request. In the event that two or more responses are received, one cell phone will be chosen. Such selection may be arbitrary, such as a random selection, or may be based upon a logical analysis using any number of potentially available data and conditions. For example, a GSM cell phone may be the highest preferred co-opted device, followed in order of less desirability of a dual-mode phone, a PCS-only (e.g. digital only) phone, a two-way pager, a PDA with Wi-Fi connectivity, and a laptop computer with Wi-Fi connectivity. Other factors, if known, such as proximity of each responding device to the requesting device, using GPS or signal strength, for example, may also enter into a logical decision to select a device for co-opting.

The job of the SNS at this point is to determine (44) if the selected cell phone can be used in the connection, message, or call, to complete the notification procedure. If (45) it is authorized to do this, it will co-opt (46) the cell phone; otherwise, it will broadcast (42) another ping request (or alternatively select another previously-responded device), and so on until it finds an authorized cell phone to use.

Figure 5:
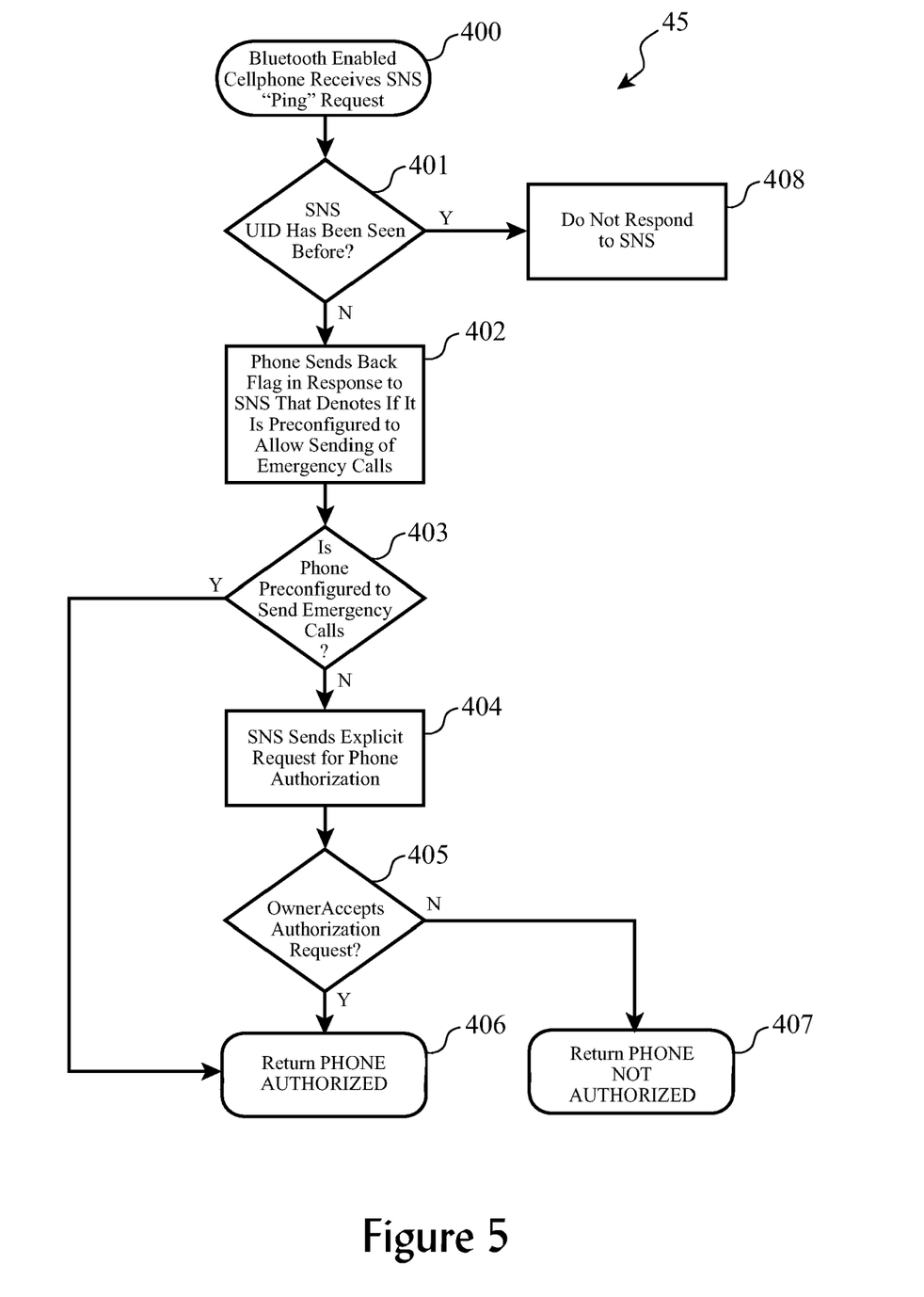
FIG. 5 illustrates a logical process for determining if a device is authorized to co-opt for long-range communications.

Turning to FIG. 5, more details of a logical process (45) to determine if a particular device is authorized is shown. Preferably, the software application on the cell phone receiving (400) the ping request tracks the serial number or other unique identifier of the SNS that sent it so that the subsequent message(s) can ignored (408), in the event of a rebroadcast from the same SNS (401). This allows another cell phone in the area to be contacted, that maybe farther away than the declining cell phone.

According to another aspect of the invention, in the response to the ping request, the cell phones that are pre-configured for emergency call use will indicate (402, 403, 406) this setting in the response message, which the SNS will parse to see if any such setting is activated. If it is present in the response message, the SNS will use the cell phone; otherwise, it preferably sends (404) a separate message to request authorization. This may implemented as a regular call, pager message, instant message, or email, where the device owner only has to answer a simple "yes" or "no" to the request in order to temporarily authorize co-opting his device for the notification function (405, 406). Otherwise (405), a message is returned to the SNS indicating that the device is not authorized to be used for the notification purpose (407). The SNS will decide what to do next depending on the response, as described in the foregoing paragraphs.

Figure 6:
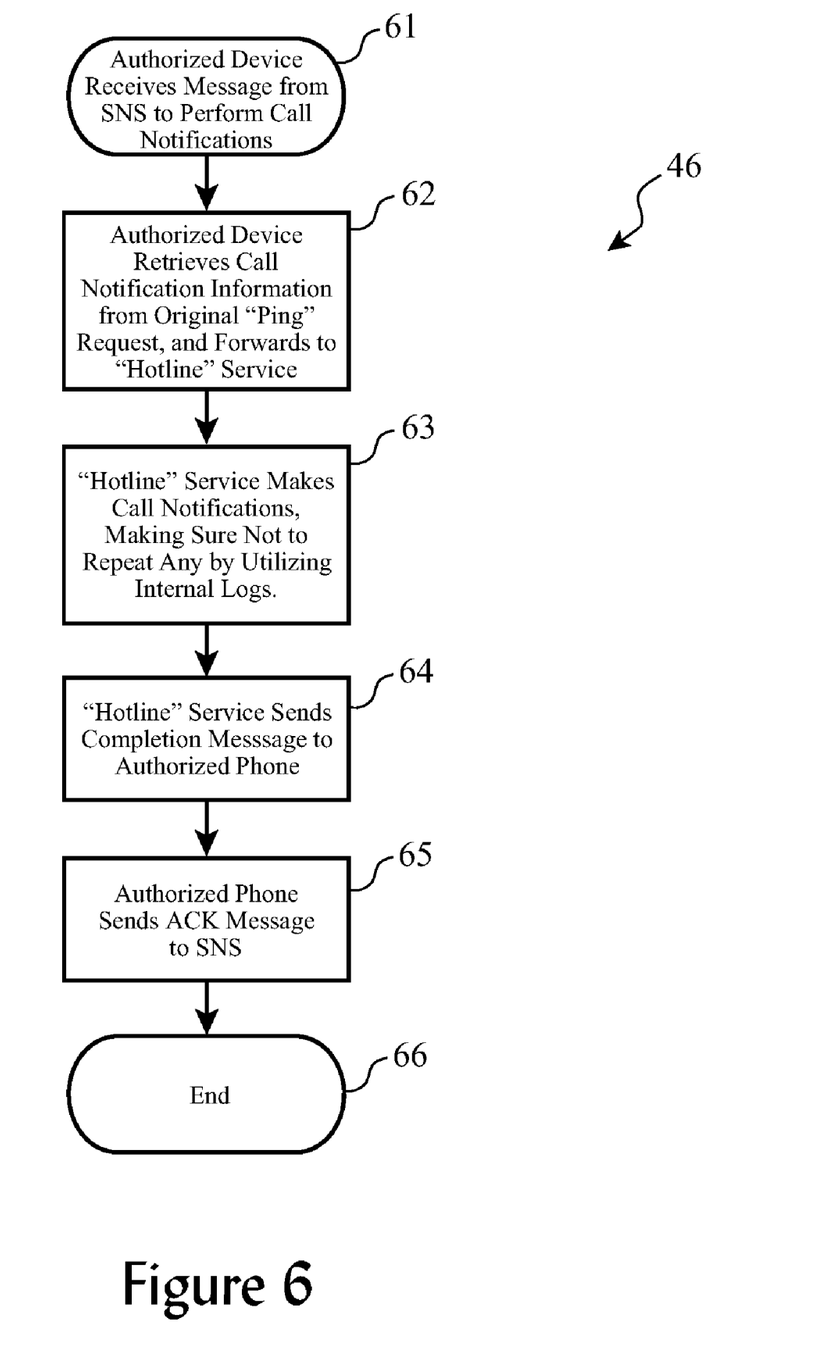
FIG. 6 sets forth a logical process for completing a notification.

Having found an available device and having received authorization to use it for emergency calls, the SNS then starts the call notification procedure. A logical process (46) according to the present invention to complete a notification is shown in FIG. 6. Because the ping request contained the call notification list information (62), all that's required now is to tell the authorized device ("AD") to place the calls, send the pages, transmit emails, etc. (61). The portion of the invention residing in the cell phone or other long-range communications-enabled device then makes the calls, messages, etc., until each one is received (63), preferably avoiding repeating any calls or messages which are successfully completed. When one or more of the notifications are complete, the AD sends a message to the SNS to acknowledge completion of the task (65), thereby ending the process for the AD.

The SNS continues to wait for the acknowledgment (47) from the Authorized Device, and if it is not received preferably within a specified period of time, the SNS preferably attempts to deliver the notification(s) through one or more additional long-range enabled devices within short-range communications of the SNS, as described in the foregoing paragraphs. The reason for this retry through another device is to handle the case where the authorization to use a first cell phone has been established, but the message to start the call notification procedure was lost because of some communication failure, such as the driver moving out of the range of Bluetooth, etc. Therefore, if the SNS does not receive an acknowledgment message within a certain window, it assumes the connection has died and rebroadcasts the ping request, restarting the process.

In order to eliminate duplicate emergency call notifications being placed, the AD preferably does not make the call directly, but rather forwards the message to a hotline established by the service provider. This hotline keeps track of the call notifications already made so that duplicate ones are not sent. For example, the serial number or another unique identifier of the SNS can be used as an accident identification number to correlate the call notifications.

The reason this hotline is preferred in the embodiment is to handle the case where an AD may have succeeded in making two of the three call notifications required, but then the connection is lost because the AD's battery died, for example. When the SNS rebroadcasts the ping message, and eventually finds another AD to use, the hotline would have known that it sent two notifications already, so it would just need to send the third.

Note that while an AD is forwarding the call notification list to the hotline, a flag is preferably set in the controlling software application, indicating that it's already servicing an emergency request. If it receives a ping request from a SNS in another accident located nearby, it preferably returns this flag in the response message saying that it is currently busy and unable to service that request.

Suitable Computing Platform

The invention is preferably realized as a feature or addition to the software already found present on well-known computing platforms such as embedded microcontrollers, but potentially on personal computers, laptop computers, tablet computers, notebook computers, personal digital assistants ("PDA"), web-enabled wireless telephones, and other types of personal information management ("PIM") devices, as well.

Therefore, it is useful to review a generalized architecture of a computing platform which may span the range of implementation, from a high-end web or enterprise server platform, to a personal computer, to a portable PDA or web-enabled wireless phone.

Figure 2A:
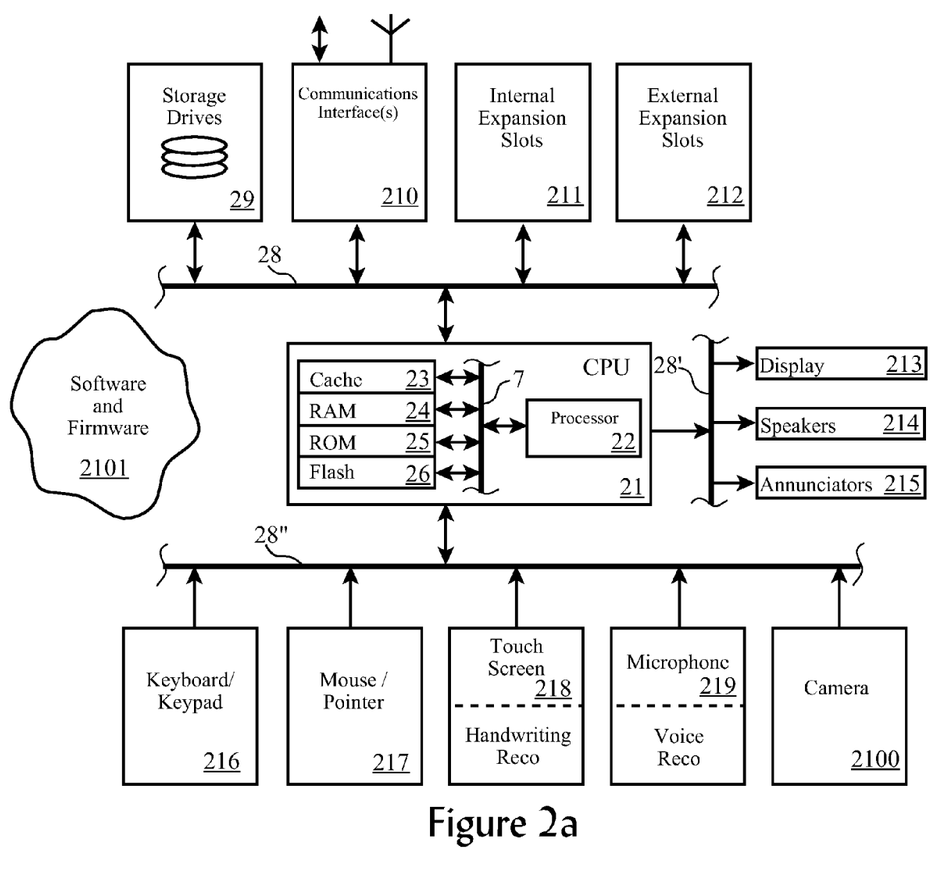
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
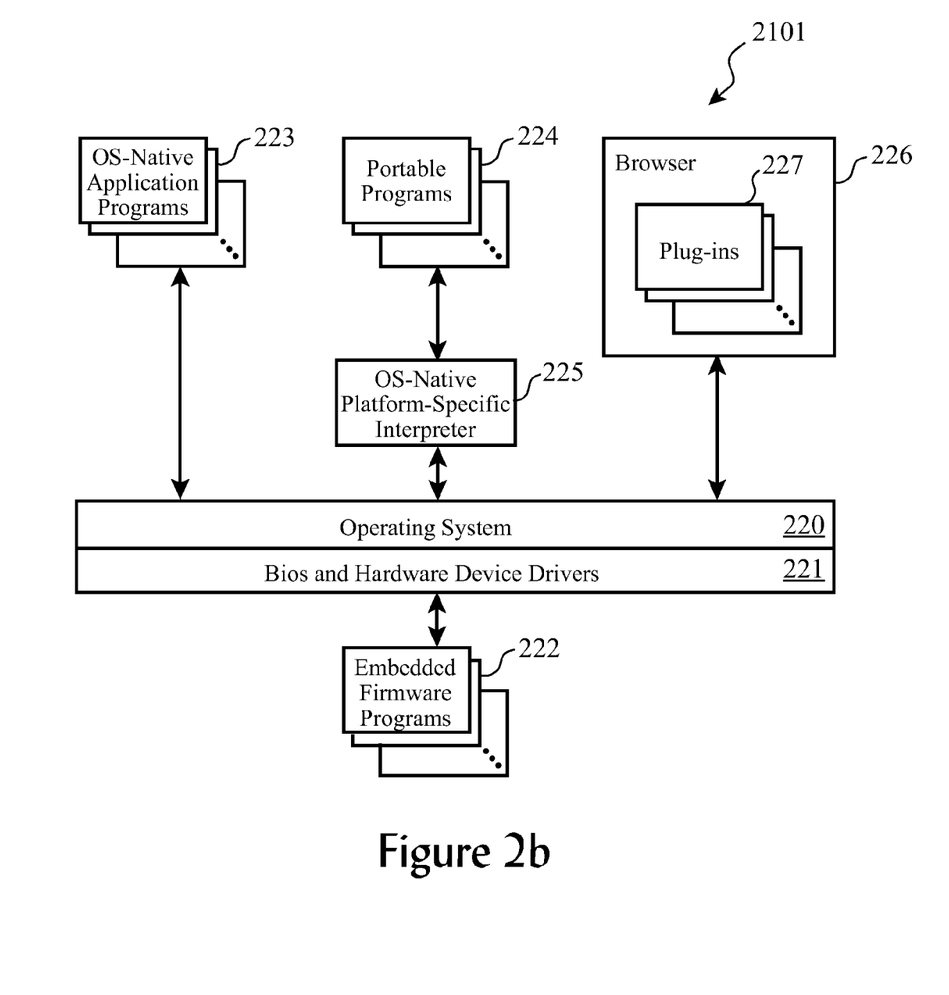

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

The methods and processes of the invention and it's associated components may be realized as a standalone executable program, script, Java Bean, application program, plug-in, etc., which accesses and modifies certain system files and resources as described in more detail in the following paragraphs, but may well be integrated into existing software such as vehicle control firmware. While the foregoing examples have focused on a realization of the invention using Bluetooth-enabled cell phones and telephone calls, it will be recognized by those skilled in the art that other devices which are enabled for short-range and long-range communications, and other protocols, can be used for alternate embodiments of the invention without departing from the spirit and scope of the present invention.

For example, the co-opted device can be short-range linked using other short-range technologies, such as IrDA or Wi-Fi. The co-opted device could be a PIM, PDA, laptop computer, two-way pager, or even another vehicle's vehicle-mounted cell phone. The long-range communication technology could alternatively be email, instant messages, or radio, for example.

As these alternative embodiment details are not exhaustive of the alternative embodiments, the scope of the present invention should be determined by the following claims.

What is claimed is:

1. A method comprising the steps of:
providing a controller and a short-range wireless communicator mounted on a vehicle, the
short-range wireless communicator having a peer-to-peer communications capability;
responsive to a requirement to transmit an emergency notification message, pinging by the short-range wireless communicator a long-range communication device contemporaneously within range of the peer-to-peer communications capability, the long-range communication device having a long-range communication and being physically detached from the vehicle;
subsequent to the pinging, receiving a response message indicating that user authorization is required;
responsive to receipt of the response message, sending by the short-range wireless communicator
to the long-range communication device a request for authorization message; subsequent to a user of the long-range communication device responding in an affirmative
manner to the authorization request, receiving an authorization message to co-opt the long-range communication device; and
responsive to the authorization, sending an emergency notification message from the short-range wireless communicator through the co-opted long-range communication device to a specified recipient party.

2. The method as set forth in claim 1 further comprising the step of sending an acknowledgment message by the co-opted long-range communication device to the short-range wireless communicator responsive to successful delivery of the notification message.

3. The method as set forth in claim 1 further comprising the step of the short-range wireless communicator selecting one or more multiple long-range communication devices contemporaneously found within range of the peer-to-peer communications capability.

4. The method as set forth in claim 1 wherein the long-range communication device has a capability for delivering the notification message to a specified party via the wireless network.

5. The method as set forth in claim 1 wherein the long-range communication device has a communication range capability greater than the peer-to-peer communications capability of the short-range wireless communicator.

6. The method as set forth in claim 1 wherein the request for authorization message comprises one or more messages selected from the group consisting of a telephone call, a pager message, an instant message and an electronic mail message.

7. A computer program product comprising:
one or more computer readable, tangible storage devices associated with a controller and a short-range wireless communicator mounted on a vehicle, the short-range communicator having a peer-to-peer communications capability;
first program instructions to, responsive to a requirement to transmit an emergency notification message, ping by the short-range wireless communicator a long-range communication device contemporaneously within range of the peer-to-peer communications capability, the long-range communication device having a long-range communication and being physically detached from the vehicle;
second program instructions to, subsequent to the pinging, receive a response message indicating that user authorization is required;
third program instructions to, responsive to receipt of the response message, send by the short-range wireless communicator to the long-range communication device a request for authorization message;
fourth program instructions to, subsequent to a user of the long-range communication device responding in an affirmative manner to the authorization request, receive an authorization message to co-opt the long-range communication device; and fifth program instructions to, responsive to the authorization, send an emergency notification message from the short-range wireless communicator through the co-opted long-range communication device to a specified recipient party; wherein the first, second, third, fourth, and fifth program instructions are stored on at least one of the one or more computer readable, tangible storage devices.

8. The computer program product as set forth in claim 7 further comprising sixth program instructions stored on at least one of the one or more computer readable storage devices to send an acknowledgment message by the co-opted long-range communication device to the short-range wireless communicator responsive to successful delivery of the notification message.

9. The computer program product as set forth in claim 7 further comprising sixth program instructions stored on at least one of the one or more computer readable storage devices to select one or more multiple long-range communication devices found contemporaneously within range of the peer-to-peer communications capability.

10. The computer program product as set forth in claim 7 wherein the long-rage communication device has a capability for delivering the notification message to the specified party via a wireless network.

11. The computer program product as set forth in claim 7 wherein the long-range communication device has a communication range capability greater than the peer-to-peer communications capability of the short-range wireless communicator.

12. The computer program product as set forth in claim 7 wherein the request for authorization message comprises one or more messages selected from the group consisting of a telephone call, a pager message, an instant message and an electronic mail message.

13. A system comprising:
a controller and a short-range wireless communicator mounted on a vehicle, the short-range communicator having a peer-to-peer communications capability, the controller having hardware to perform a logical process;
a locator portion of the controller which, responsive to a requirement to transmit an emergency notification message, pings a long-range communication device contemporaneously within range of the peer-to-peer communications capability, the long-range communication device having a long-range communication and being physically detached from the vehicle;
a first receiver portion of the controller which, subsequent to the pinging, receives a response message indicating that user authorization is required;

an authorization requester portion of the controller which, responsive to receipt of the response message, sends to the long-range communication device a request for authorization message;

a second receiver portion of the controller which, subsequent to a user of the long-range communication device responding in an affirmative manner to the authorization request, receives an authorization message to co-opt the long-range communication device; and a message transmitter portion of the controller which, responsive to the authorization, sends an emergency notification message from the short-range wireless communicator through the co-opted long-range communication device to a specified recipient party.

14. The system as set forth in claim 13 further comprising the message transmitter portion of the controller sending an acknowledgment message by the co-opted long-range communication device to the short-range wireless communicator responsive to successful delivery of the notification message.

15. The system as set forth in claim 13 further comprising the short-range wireless communicator selecting one or more multiple long-range communication devices found contemporaneously within range of the peer-to-peer communications capability.

16. The system as set forth in claim 13 wherein the long-range communication device has a capability for delivering the notification message to the specified party via a wireless network.

17. The system as set forth in claim 13 wherein the long-range communication device has a communication range capability greater than the peer-to-peer communications capability of the short-range wireless communicator.

18. The system as set forth in claim 13 wherein the request for authorization message comprises one or more messages selected from the group consisting of a telephone call, a pager message, an instant message and an electronic mail message.

* * * * *